Sept. 4, 1928.
B. B. ANNIS
1,683,322
VALVE
Filed June 7, 1926
2 Sheets-Sheet 1
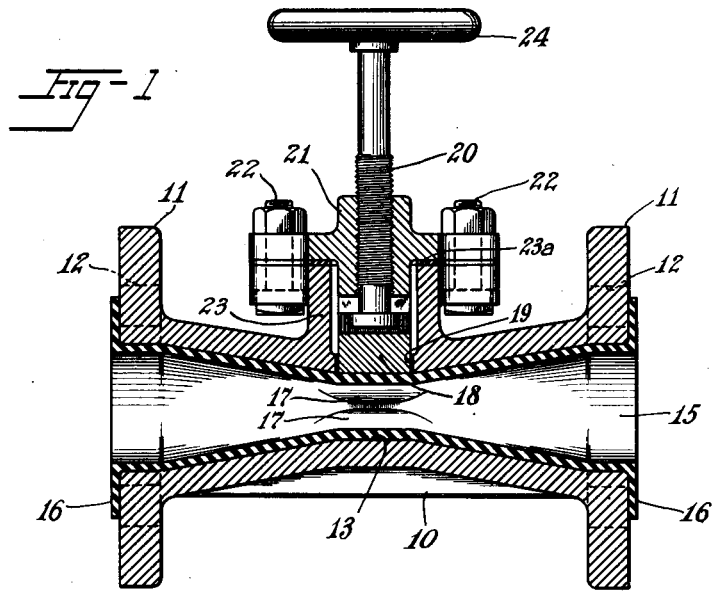
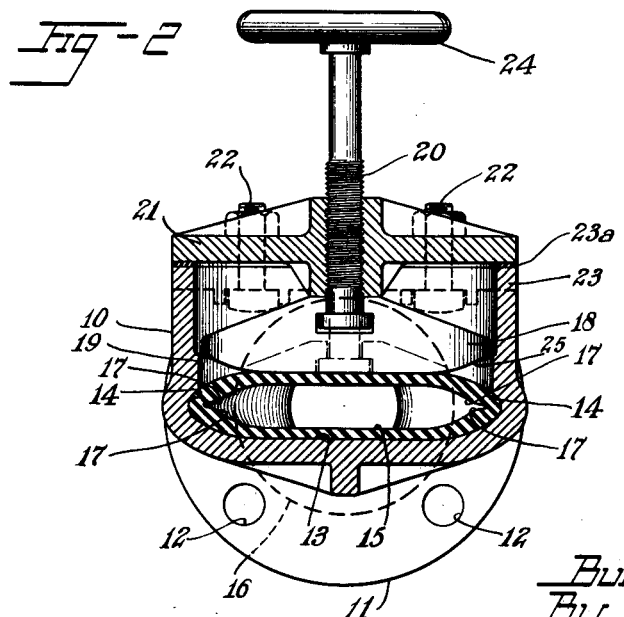
Inventor
Burton B. Annis
By Davisson, Eakin & Avery
Attys.

Sept. 4, 1928.  B. B. ANNIS  1,683,322

VALVE

Filed June 7, 1926   2 Sheets-Sheet 2

Inventor
Burton B. Annis
By Pierson, Eakin & Avery
Attys.

Patented Sept. 4, 1928.

1,683,322

UNITED STATES PATENT OFFICE.

BURTON B. ANNIS, OF AKRON, OHIO, ASSIGNOR TO THE B. F. GOODRICH COMPANY, OF NEW YORK, N. Y., A CORPORATION OF NEW YORK.

VALVE.

Application filed June 7, 1926. Serial No. 114,163.

This invention relates to valves and more particularly to valves lined with material adapted to resist the action of chemicals, as in the case of rubber-lined valves.

My chief objects are to provide a valve of simplified construction adapted to avoid contact of the contained fluid with metal parts in the opening and closing of the valve; to provide a valve having a lining of rubber or the like which may be of simple form and may be continuous throughout the extent of both the fixed and the movable parts of the valve; to provide a valve of inexpensive construction; to provide a lined valve in which the lining readily may be renewed; and to provide a valve lining adapted for long service.

Of the accompanying drawings:

Fig. 1 is a longitudinal, vertical section of a valve embodying my invention in its preferred form.

Fig. 2 is a transverse, vertical section of the same.

Figure 3:
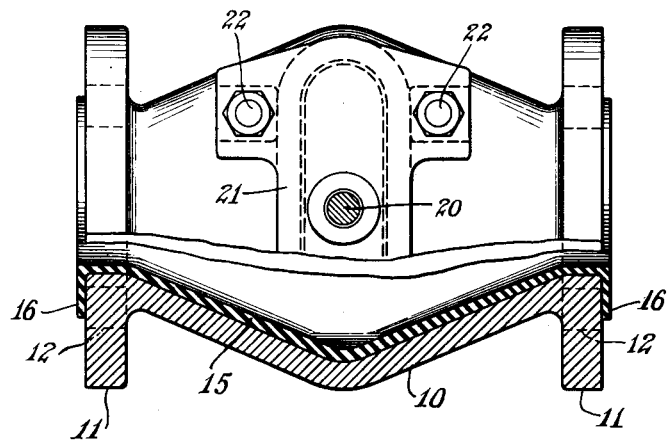
Fig. 3 is a view of the valve from above, a portion of the same being shown in plan view and other portions being broken away and in section.
Figure 4:
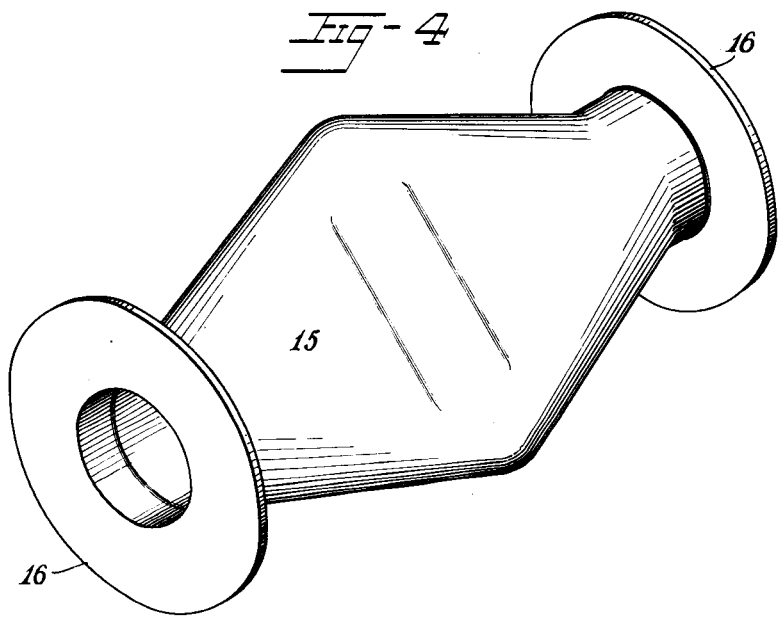
Fig. 4 is a perspective view of the valve lining in a partially inverted position.

Referring to the drawings, the valve comprises a casing 10 of rigid material, preferably metal, having at its ends attachment flanges 11, 11 formed with bolt holes 12, 12. The fluid passage through the casing may be of circular form at the ends thereof, as shown, but at the middle portion of the casing its passage is preferably of oblate cross-sectional form, with its cross-sectional area preferably about equal to that of each of its end portions. At the middle of the casing its lower and side walls are preferably so shaped as to provide an inner surface 13 which may be defined as being of C shape, in a cross-sectional plane of the casing, and which is preferably flat for a considerable distance lengthwise of the casing, the inner face of each side wall curving upwardly and inwardly toward the middle of the casing as shown at 14, 14, so that the said C-shaped surface is adapted to fit about the lower face, and, at each side, to fit about a part of the upper face, of a rubber tube or conduit 15 mounted as a lining member in the casing, as shown in Fig. 2, and adapted to be collapsed in the manner of a pinch-valve to stop flow of fluid through the valve.

The rubber lining member 15 is formed at each end with an outwardly extending sealing flange 16 adapted to seal the casing 10 against such conduits as the valve may be assembled with. The flanges are also adapted to hold the lining in position within the casing 10, both when the latter is assembled and when it is dis-assembled, the lining preferably having no adhesion to the interior of the casing, so that it readily may be removed and a new lining substituted in case of breakage or deterioration.

At its middle portion the lining member 15 is adapted to be flattened or collapsed so that its upper and lower walls contact each other to close it against the passage of fluid, the walls hinging about the portions thereof lying within the end curves of the C-shaped surface 13. The lining member is preferably molded to oblong cross-sectional form at its middle portion and in order that the upper and lower walls may be brought into contact with each other closely adjacent the hinge line without excessive local flexure and strain the walls are formed adjacent the hinge line with relatively thick, inwardly bulged zones 17, 17, so that the lining, when uncollapsed, has a passage which in cross-section is oblong, with reverse curves in its outline adjacent its extremities.

For so collapsing the middle portion of the lining member 15 a plunger 18 is slidably mounted in an aperture 19 formed in the upper wall of the casing and is swivelled upon the lower end of an actuating screw 20 which is threaded through a cap member 21 secured, by bolts, 22, 22, upon a hollow, flanged boss 23 formed upon the upper face of the casing, the screw 20 having a hand wheel 24 secured upon its upper end.

The cap member 21 is sealed to the boss 23 by a gasket 23ª, so that in case of breakage of the lining 15 the valve structure will continue to confine the contained fluid, although the fluid then contacts the metal parts, and this gives an attendant an opportunity to stop the flow at some point nearer its source, for repair of the valve, without escape of fluid resulting from the breakage of the lining.

The lower face 25 of the plunger 18 is preferably of a form approximately complemental to that of the C-shaped surface 13, exclusive of the latter's extreme end portions, so that the plunger is adapted to force the upper wall of the lining into contact with the lower wall of the lining simultaneously throughout the entire width of the lining while the lower wall of the lining remains in its normal shape against the surface 13.

In the operation of the valve, the valve is closed by screwing down the actuating screw 20 and thus causing the plunger 18 to collapse the middle portion of the lining and to cause the latter's upper and lower walls to seal against each other throughout their widths, and the valve is opened by reverse operation of the screw 20.

The curved complemental form of the casing and of the surface 25 of the plunger, together with the thickened form of the lining walls at 17, 17, provide for the complete collapsing of the lining with less strain thereof at the hinge lines than would occur in the case of a tube of even wall thickness completely collapsed between two plane surfaces, and the flattened normal form of the lining in the region in which it is collapsed permits it to be completely collapsed with comparatively little distortion from its normal shape as compared with the collapsing of a tube of circular section, and yet its cross-sectional area in the said region may be equal to or greater than its cross-sectional area in its other portions, so that the flow capacity of the lining may be substantially equal throughout its length. The form of the valve, as shown, may be such as to provide for direct, stream-line flow of the fluid therethrough, so that internal friction and wear are comparatively small.

The flattened form of the casing 10 at its middle portion permits the plunger 18 completely to close and open the valve with a comparatively short movement, so that time is saved and so that the rubber lining when the valve is closed may be backed against the force of the enclosed fluid by the side face of the plunger 18 and the inner face of the casing adjacent thereto without excessive stretching of the rubber lining in the angle between the two.

When the valve is opened and the flow starts the static pressure of the fluid upon the elastic lining in the said angle is consequently decreased, so that the lining, by reason of its elasticity, creeps back to its normal form without being so pressed into the angle as to be pinched between the casing and the plunger in the opening movement of the latter.

This type of valve permits the use of a lining which is continuous throughout the casing and by thus avoiding parting planes between lining members avoids wear of one lining member upon another and avoids leakage of fluid such as would damage metal parts of the valve and result in contamination of the fluid by the reaction products.

The lining very readily may be removed and substituted by a new lining, since it requires no adhesion to the casing.

My invention is susceptible of modification within its scope and I do not wholly limit my claims to the specific construction here shown.

I claim:

1. A valve comprising a rigid casing, a removable, collapsible, conduit constituting a lining therefor, and means traversing a wall of the casing for collapsing the conduit, an inner cross-sectional contour line of the said conduit constituting a figure tapering outwardly with reverse curvature to an acute apex at each hinge-line of the conduit when the conduit is in uncollapsed form.

2. A valve comprising a collapsible conduit formed for approximately stream-line flow of fluid therethrough throughout the extent of the valve-structure, means for collapsing the conduit, and a metallic structure surrounding the conduit to limit its expansion under the force of contained fluid, the mutually contacting faces of the said conduit adjacent a hinge-line thereof meeting each other at the hinge line at an acute angle such that they may seal against each other throughout the cross-section of the conduit without substantially greater strain of the conduit wall at the hinge line than at other parts of the conduit.

3. A valve comprising a collapsible conduit and means for collapsing the conduit in the manner of a pinch-valve, the conduit having, when uncollapsed, a form such that its passage, in a cross-sectional plane, is of oblong form with reverse curves in its outline meeting each other in an acute, outwardly pointed apex at each of its extremities in the said plane.

In witness whereof I have hereunto set my hand this 2nd day of June, 1926.

BURTON B. ANNIS.